Nov. 8, 1932.  E. JANSSEN  1,886,690
INDOOR PLANT STARTER
Filed July 20, 1931
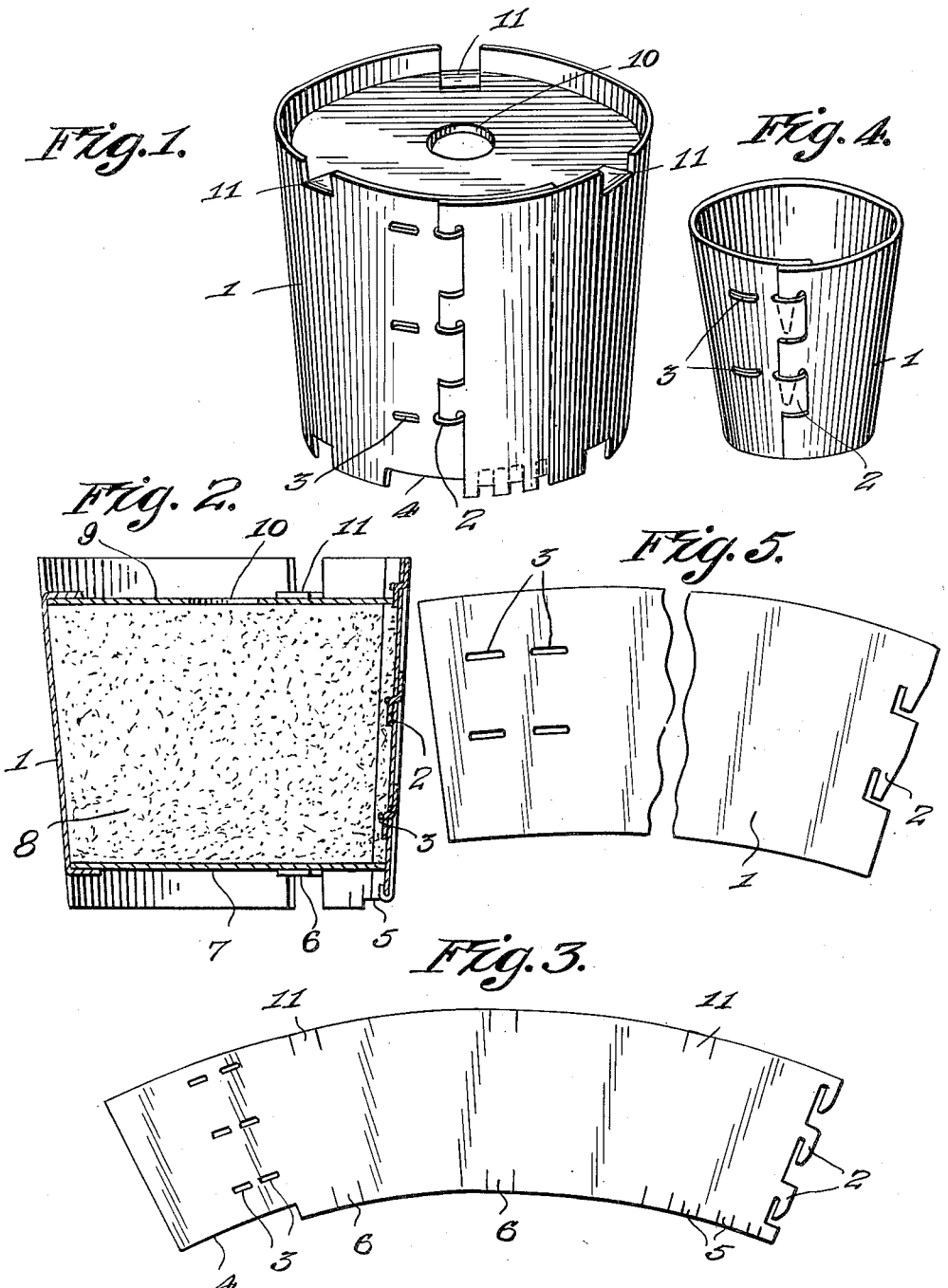

Patented Nov. 8, 1932

1,886,690

UNITED STATES PATENT OFFICE

EARNEST JANSSEN, OF HERRIN, ILLINOIS

INDOOR PLANT STARTER

Application filed July 20, 1931. Serial No. 552,057.

This invention relates to plant starters and it consists in the novel features hereinafter described and claimed.

An object of the invention is to provide a simple and an efficient device adapted to be used by the home gardener to obtain early vegetables and flowers at very small cost.

The device consists of a strip of metal, preferably tin, provided at its ends with fastening means whereby the end portions may be joined together and the strip formed in the general shape of the body of a can. The strip is provided at one end with a recess and at its other end with a series of tongues any one of which may be bent into the recess whereby the end portions of the strips are securely held connected with each other. The strip is provided at its lower edge with a series of lugs adapted to be bent inwardly and upon which a bottom disk may be supported. The soil is filled into the can body and rests upon the bottom and the seed or plant is started in the soil. When it is desired to ship the plant while growing a top disk is placed upon the soil, said disk having an opening adapted to receive the plant. The can body is provided at its upper edge with lugs which may be bent down upon the top disk to hold the same in place.

In the accompanying drawing:—

Figure 1 is a perspective view of one form of the plant starter.

Figure 2 is a vertical sectional view thereof.

Figure 3 is a plan view of the strip which forms the body of the plant starter.

Figure 4 is a perspective view of a modified form of the plant starter.

Figure 5 is a fragmentary plan view of the strip used in the form as shown in Figure 4.

In the form of the invention as shown in Figures 1, 2 and 3 of the drawing the plant starter consists of a strip 1 of sheet metal, said strip being provided at one end with a series of hooks 2 and at its opposite end portion with several sets of openings 3 the said openings being adapted to receive the hooks 2 whereby the end portions of the strip 1 are connected with each other. The strip 1 is provided at its lower edge and at one end with a recess 4 and at its opposite end with a series of tongues 5 which may be bent up into the recess 4 for holding the hooks 2 in engagement with the openings 3. The strip 1 is provided at its lower edge with a series of spaced lugs 6 which may be bent up to support a bottom wall 7 as best shown in Figure 2 of the drawing. The wall 7 is in the form of a disk and preferably is of paper. The soil indicated at 8 may be filled into the body and rest upon the bottom wall 7. The seed or plant (not shown) is started in the soil 8. When it is desired to ship the plant starter while the plant is growing a top disk 9 is inserted in the upper portion of the body and rests upon the soil 8. The top disk 9 is provided with an opening 10 adapted to receive the plant. Lugs 11 are formed at the upper edge portion of the strip 1 and may be bent down upon the top disk 9 and hold the same in place.

When it is desired to set the plant out in the ground, a hole is dug and the body of the starter is placed in the hole so that the bottom disk 7 rests upon the bottom of the hole. The tongues 5 are bent from under the lower edge of the recess 4 and the hooks 2 are disengaged from the openings 3 whereby the strip 1 may be lifted out of the hole leaving the soil 8 and the disk 7 in the hole. The strip 1 may be straightened out and used again.

The form of the device as shown in Figures 4 and 5 of the drawings is simplified in that the recess 4, tongues 5 and the lugs 6 and 11 are not used.

Having described the invention what is claimed is:

1. A plant starter comprising a strip provided at one end with a series of hooks having downwardly disposed bill ends and provided at its opposite end portion with a series of openings adapted to receive the hooks, said strip being provided at one end with a recess and having at its opposite end portion a series of tongues adapted to be bent under the edge of said recess.

2. A plant starter comprising a strip provided at one end with a series of hooks and having at its opposite end a series of openings adapted to receive the hooks, said strip having at one end a recess and provided at its opposite end portion with a series of tongues adapted to be bent under the edge of said recess, said strip having at its edge a series of lugs adapted to be bent inwardly and a disk resting upon said lugs.

3. A plant starter comprising a strip provided at one end with a series of hooks and having at its opposite end a series of openings adapted to receive the hooks, said strip being provided at one end with a recess and at its opposite end with a tongue adapted to be bent under the edge of the recess, said strip having at its upper and lower edges spaced lugs adapted to be bent inwardly and disks adapted to be engaged by said lugs.

In testimony whereof I affix my signature.

EARNEST JANSSEN.